United States Patent
Hasegawa et al.

(10) Patent No.: US 7,840,973 B2
(45) Date of Patent: Nov. 23, 2010

(54) OPTICAL DISC DEVICE HAVING IMPROVED DISC DETECTION

(75) Inventors: Kazunori Hasegawa, Kanagawa (JP); Tsukasa Nakayama, Kanagawa (JP); Hiroto Nishida, Ishikawa (JP); Isamu Nakade, Ishikawa (JP); Kenji Urushihara, Kanagawa (JP); Masataka Hashimoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 681 days.

(21) Appl. No.: 11/814,289

(22) PCT Filed: Jan. 19, 2006

(86) PCT No.: PCT/JP2006/300741

§ 371 (c)(1),
(2), (4) Date: Jul. 19, 2007

(87) PCT Pub. No.: WO2006/077923

PCT Pub. Date: Jul. 27, 2006

(65) Prior Publication Data

US 2009/0007163 A1    Jan. 1, 2009

(30) Foreign Application Priority Data

Jan. 20, 2005    (JP) .............................. 2005-013147

(51) Int. Cl.
*G11B 17/04*    (2006.01)

(52) U.S. Cl. ....................................... 720/623

(58) Field of Classification Search ................... 720/623
See application file for complete search history.

(56) References Cited

U.S. PATENT DOCUMENTS

| | | | | |
|---|---|---|---|---|
| 4,695,996 | A * | 9/1987 | Sugihara et al. | 720/623 |
| 6,288,982 | B1 * | 9/2001 | Kato | 369/30.36 |
| 2001/0043552 | A1 | 11/2001 | Takemasa et al. | |
| 2002/0057643 | A1 | 5/2002 | Yoshida et al. | |

FOREIGN PATENT DOCUMENTS

| | | |
|---|---|---|
| JP | 61-45760 | 3/1986 |
| JP | 2000-040290 | 2/2000 |

OTHER PUBLICATIONS

Supplementary European Search Report for Application No. EP 06 71 1987, Feb. 2, 2009, Panasonic Corporation.

* cited by examiner

*Primary Examiner*—David D Davis
(74) *Attorney, Agent, or Firm*—RatnerPrestia

(57) ABSTRACT

An optical disc device capable of sensing exactly whether or not a disc is present is provided. In an optical disc device includes a main body having a disc slot, and a carrying roller for carrying a disc between the disc slot and a disc loading position of the main body, a swinging lever whose base end is supported turnably in an inside of the main body by a supporting shaft and to which a disc arriving switch is fixed, and a sensing lever whose base end is supported turnably by the supporting shaft and whose top end contacts the outer periphery of the disc, which is loaded in the disc loading position, to operate the disc arriving switch are provided.

2 Claims, 13 Drawing Sheets

OPTICAL DISC DEVICE HAVING IMPROVED DISC DETECTION

THIS APPLICATION IS A U.S. NATIONAL PHASE APPLICATION OF PCT INTERNATIONAL APPLICATION PCT/JP2006/300741.

TECHNICAL FIELD

The present invention relates to an optical disc device that is capable of deciding whether or not a disc is present in a loading position after the disc is carried to the position by a carrying roller.

BACKGROUND ART

Owing to diversification of the fitting location, miniaturization, quietness, and high operational stability in sensing an optical disc, etc. are often demanded of the optical disc device as in the onboard one, for example.

An optical disc device 100 of this type will be explained with reference to FIG. 12 to FIG. 14 hereunder. In FIG. 12, 101 is a box-type case, and a disc slot is formed in a front plate 101A of the case 101. Also, 102 is a disc loading roller arranged in vicinity of the disc slot, and this roller 102 is turned by a roller driving mechanism (not shown) to insert/eject a disc 103. Also, 104 is a semi-annular tray for holding the disc 103, and plural sheets of trays 104 are stacked in the case 101 on the corner portion side between a rear plate 101B and a right side plate 101C (see JP-A-2000-40290, FIG. 1, FIG. 8, FIG. 10, for example).

A metal plate 105 is arranged on the uppermost side and the lowermost side of plural sheets of trays 104 respectively, and a hole is formed in the tray 104 and the metal plates 105 at three locations respectively. Three tray guiding shafts both ends of each of which are fixed to a top plate and a bottom plate of the case 101 respectively are inserted into the holes of the tray 104 and the metal plates 105. Therefore, plural trays 104 and the metal plates 105 can be guided by three tray guiding shafts to move vertically. Also, 106 is a lever that is supported turnably in the case 101, and a roller 107 is fitted to a top end of this lever 106.

The lever 106 is energized clockwise (FIG. 12) by a spring (not shown). The disc 103, after inserted through the disc slot formed in a center of the front plate 101A, is transferred toward the rear plate 101B in the case 101 by the roller 102. The roller 107 fitted to the top end of this lever 106 contacts an outer peripheral surface of the disc 103 in the middle of this transfer. Therefore, the direction of the disc is changed to the tray 104 and then the disc 103 is loaded in the tray 104.

In the optical disc device 100, the disc 103 moved to a center of the case 101 pushes the roller 107 on the lever 106 as shown in FIG. 13 such that the lever 106 is turned on a shaft 108 counterclockwise in FIG. 12. In FIG. 13, 106A is a projection formed integrally on an upper surface of the lever 106, and 109 is a photo coupler a light emitting device and a photo detector of which are arranged to face to each other.

When a motor for moving an elevator mechanism that causes a plurality of trays 104 to ascend/descend is rotated, a turning/driving force of the motor is transferred to a cam gear 110 shown in FIG. 12 and FIG. 14 via a reduction gear mechanism, and then the cam gear 110 is rotated. Then, the disc 103 when pushed by a projection 111 of the cam gear 110 to a center of the case 101 pushes the roller 107, and then the lever 106 is turned counterclockwise. Then, the projection 106A is released from the photo coupler 109, so that the photo coupler 109 is shifted from OFF to ON. As described above, it is sensed whether or not the disc 103 is present on the tray 104 in such a manner that the projection 111 of the cam gear 110 is inserted sequentially between the trays in the course of lowering plural sheets of trays 104 by the tray elevating mechanism and then it is sensed by the photo coupler 109 whether or not the lever 106 is turned at an insertion timing. Here, in FIG. 14, 110A is a helical cam groove, and 110B, 110C are cam threads of the cam gear 110.

DISCLOSURE OF THE INVENTION

Problems that the Invention is to Solve

However, in the optical disc device in the prior art, when it is decided whether the disc is present or not, normally the disc is moved by the pushing-out lever and then the disc pushes other lever to discriminate ON/OFF of the photo coupler, and as a result it is sensed whether or not the disc is present. Therefore, since the pushing-out lever for moving the disc and the sensing lever for sensing whether or not the disc is present are different, there existed the problem that, when operational errors of respective members occur simultaneously, a sensing accuracy is lowered and it is impossible to sense precisely whether or not the disc is present. Also, since the disc is moved by pushing merely a part of the outer periphery of the disc by means of the pushing-out lever to come into contact with other sensing lever in sensing, either a decision accuracy is affected depending on a precision of the mechanical structure or the disc must be pushed out. Therefore, when an outer diameter of the disc is different from a standard one or the disc is not formed as a true circle, a malfunction will be easily caused in pushing or sensing the disc and it is likely that a false sensing is made.

The present invention has been made to solve the problems in the prior art, and aims at providing an optical disc device capable of sensing exactly whether or not an optical disc is present.

MEANS FOR SOLVING THE PROBLEMS

An optical disc device of the present invention, includes a main body having a disc slot; a carrying roller for carrying a disc between the disc slot and a disc loading position of the main body; a swinging lever whose base end is supported turnably in an inside of the main body by a supporting shaft and to which a disc arriving switch is fixed; and a sensing lever whose base end is supported turnably to the supporting shaft and whose top end contacts an outer periphery of the disc, which is loaded in a disc loading position, to operate the disc arriving switch.

According to this configuration, unlike the configuration in the prior art, there is no need to provide the pushing-out lever and the sensing lever separately and drive/control the pushing-out lever at a timing that is changed during carrying the disc. Therefore, an error due to a delay of the sensing operation generated by operating a plurality of members jointly, and the like is not caused.

Also, in the optical disc device of the present invention, the swinging lever and the sensing lever are simultaneously swung on the supporting shaft, and the disc arriving switch is pushed and operated by the sensing lever which is swung when the sensing lever contacts the outer periphery of the disc, so that it is sensed whether or not the disc is present.

According to this configuration, the presence/absence of the disc is sensed based on a relative positional change of the swinging lever and the sensing lever that are swung on the same supporting shaft. Therefore, an error generated because plural levers are operated is not caused.

ADVANTAGE OF THE INVENTION

As apparent from the above explanation, according to the present invention, it is feasible to sense exactly with a simple configuration whether or not the optical disc is present.

Figure 1:
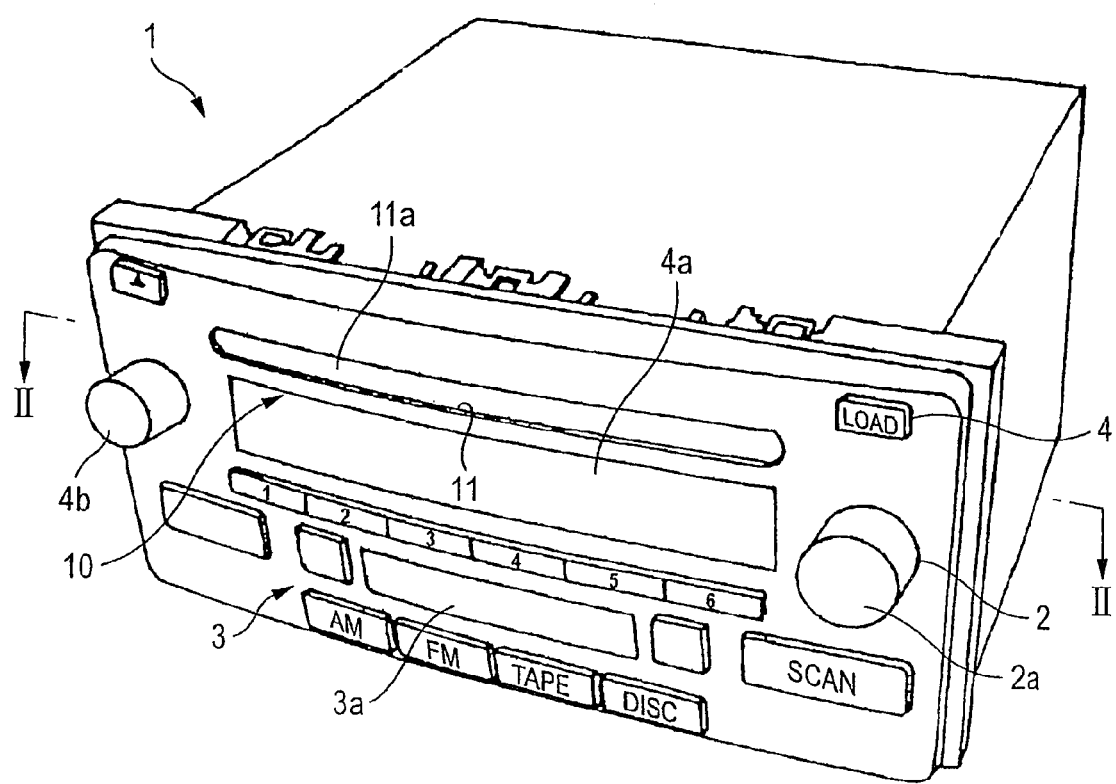
[FIG. 1] A general perspective view of a car audio equipment in which an optical disc device according to an embodiment of the present invention is built.

DESCRIPTION OF REFERENCE NUMERALS AND SIGNS 10 optical disc device
11 disc slot
12 disc
13 main body
14 roller member (carrying roller)
15 push-on lever
15a base end
17 supporting shaft
24 supporting shaft
25 swinging lever
25a base end
25b top end
26 disc arriving switch
27 sensing lever
27a base end
Dp disc loading position

BEST MODE FOR CARRYING OUT THE INVENTION

An optical disc device according to an embodiment of the present invention will be explained with reference to the drawings hereinafter.

An embodiment of the present invention is shown in FIG. 1.

A general perspective view of a car audio equipment 1 in which an optical disc device 10 according to an embodiment of the present invention is built is shown in FIG. 1. A radio 2, a cassette tape player 3, etc. as well as the optical disc device 10 are built in the car audio equipment 1. An optical disc slot 11 for the optical disc device 10, a radio tuning knob 2a, a cassette tape insertion slot 3a, and the like are provided to a front panel 4 in addition to a display portion 4a used commonly in all functions and a power/volume knob 4b. Also, a controlling portion (not shown) for controlling the radio 2, the cassette tape player 3, the optical disc device 10, etc. is provided on the inside.

Figure 2:
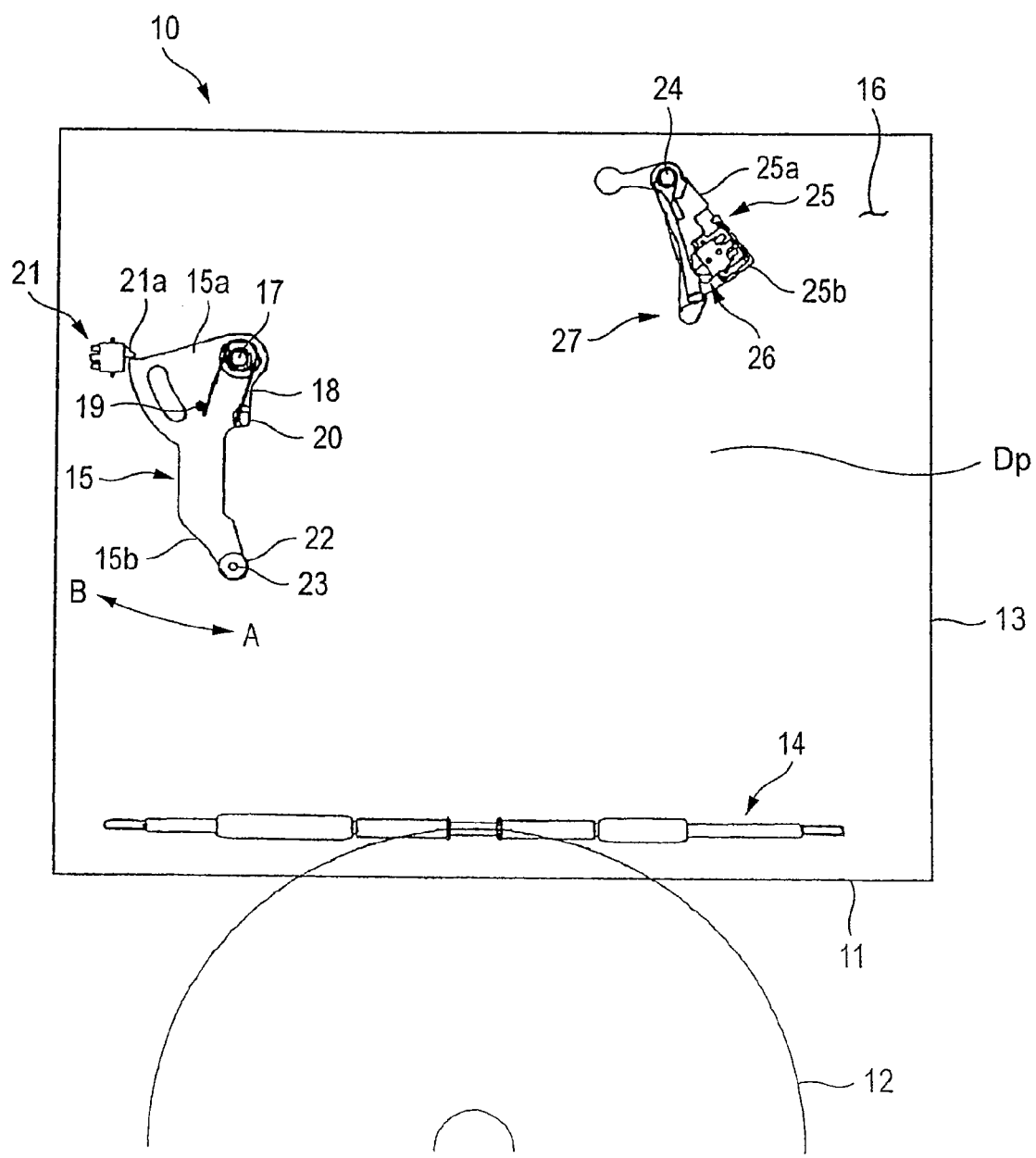
[FIG. 2] A sectional view of the optical disc device according to the embodiment of the present invention, which is built in the car audio equipment, taken along a II-II position in FIG. 1.

A sectional view of the optical disc device 10 according to the embodiment of the present invention, which is built in the car audio equipment 1, taken along a II-II position in FIG. 1 is shown in FIG. 2.

As shown in FIG. 2, the optical disc device 10 is equipped with a rectangular box-like main body 13, a roller member 14 provided in vicinity of the disc slot 11 of the main body 13 to constitute a carrying roller, and a power source (not shown) for rotating the roller member 14. This carrying roller contacts a disc 12 being inserted, transfers a power to the disc 12 to carry it, and inserts (loading) and discharges (ejecting) the disc 12. A carrying unit for loading and ejecting the disc is constructed by the roller member 14, and an upper roller member (not shown) provided in a perpendicular direction of a sheet of FIG. 2 to the roller member 14. This upper roller member is rotated in synchronism with the roller member 14 in loading and ejecting the disc 12.

A motion of the roller member 14 is restricted in the vertical direction (A direction or B direction in FIG. 2) with respect to the main body 13. Also, the upper roller member (not shown) can be moved in a vertical direction (perpendicular direction of a sheet of FIG. 2) with respect to the main body 13. This upper roller member is energized in a downward direction (direction approaching to the roller member 14) with respect to the main body 13 by an action of the elastic member (not shown) that energizes the upper roller member.

Therefore, when the disc 12 is inserted into the drive, the upper roller member (not shown) moves in an upward direction (direction leaving from the roller member 14) with respect to the main body 13, and the disc 12 is put between the roller member 14 and the upper roller member. Here, a movable distance of the upper roller member in the upward direction is allowed in excess of a moving distance required when plural sheets (e.g. two sheets) of discs are inserted. Even when plural sheets of discs are inserted into the drive, the roller member 14 and the upper roller member can push the discs rotatably such that the discs can be loaded and ejected.

Also, a push-on lever 15 is provided near the disc slot 11 of the main body 13 on the inner side than the roller member 14 in the loading direction. A supporting shaft 17 is provided upright on the main body 13 in the perpendicular direction to a face of the disc 13 that is loaded in a disc loading position Dp. A base end 15a of the push-on lever 15 is supported turnably by the supporting shaft 17, and a top end 15b can be turned in the arrow A, B directions in FIG. 2. A helical spring 18 as an energizing unit is fitted on the supporting shaft 17. One end of the helical spring 18 contacts a spring hook 19 provided upright on a base 16, and the other end contacts a spring hook 20 of the push-on lever 15. Accordingly, the push-on lever 15 is energized in the arrow A direction. Here, because the push-on lever 15 contacts a stopper (not shown) provided upright on the main body 13, its turn in excess of a predetermined amount in the arrow A direction is restricted.

The push-on lever 15 pushes the disc 12 being carried by the roller member 14 into the disc loading position Dp by using an energizing force of the spring 18 in the arrow A direction. A loading completion switch 21 is provided to the base 16 near the push-on lever 15, and the loading completion switch 21 has a contact 21a that switches Hi (OFF) and Lo (ON) of an output signal. The contact 21a of the loading completion switch 21 contacts the base end 15a of the push-on lever 15 and operates when the push-on lever 15 swings.

In other words, in a condition that the disc 12 is unloaded in the disc loading position Dp shown in FIG. 2, the contact 21a is not pushed and an output signal of the loading completion switch 21 goes to Hi (OFF). In contrast, when the disc 12 is loaded by the roller member 14 and the push-on lever 15 is turned by the disc 12 in the arrow B direction, the contact 21a is pushed by the base end 15a and the output signal of the loading completion switch 21 goes to Lo (ON). Then, when the disc 12 is pushed on by the push-on lever 15 and is loaded in a predetermined position of the disc loading position Dp, the push-on lever 15 is turned again by an energizing force of the spring 18 in the arrow A direction and is moved in a position shown in FIG. 2. Thus, the output signal of the loading completion switch 21 goes to Hi (OFF).

A roller 22 is provided rotatably to the top end 15b of the push-on lever 15 via a shaft 23. The roller 22 acts to reduce a contact friction between the top end 15b of the push-on lever 15.

Figure 3:
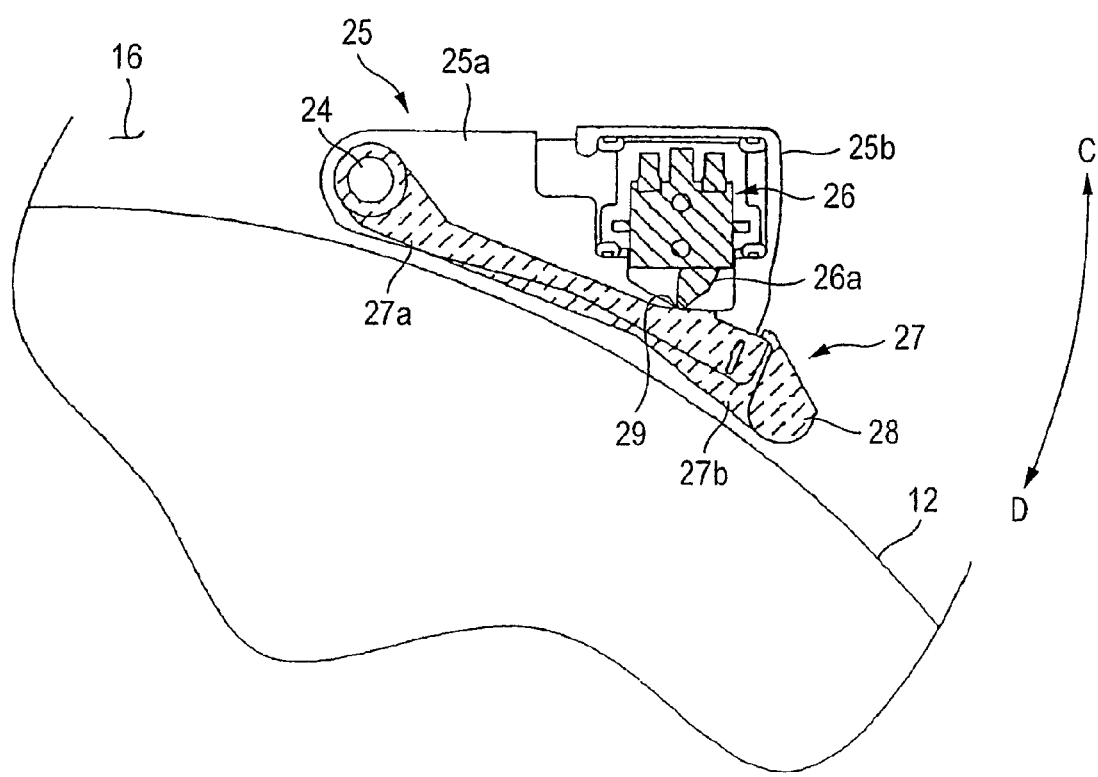
[FIG. 3] An enlarged plan view of a swinging lever and a sensing lever provided in a disc loading position on this side in the disc insertion direction, in the optical disc device according to the embodiment of the present invention.
Figure 4:
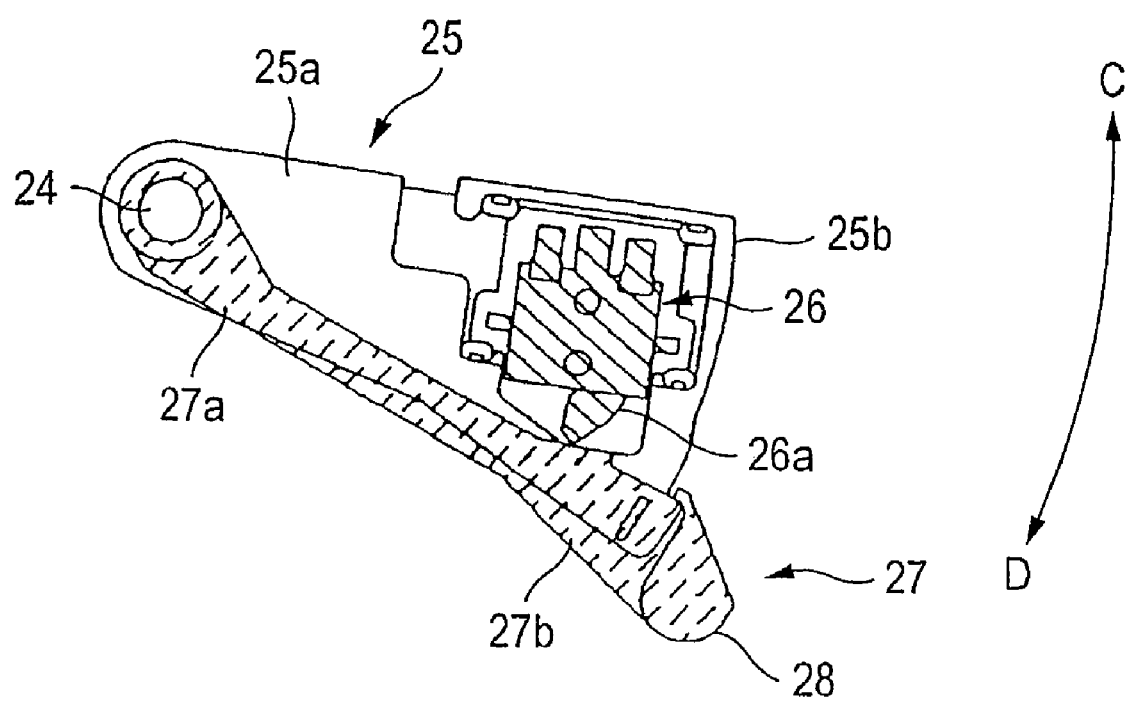
[FIG. 4] An enlarged plan view of a swinging lever and a sensing lever showing a state that no disc is present in a disc sensing portion in the embodiment of the present invention.

An enlarged plan view of a swinging lever and a sensing lever provided in the disc loading position on the inner side in the disc insertion direction is shown in FIG. 3, and an enlarged plan view of the swinging lever and the sensing lever showing a state that no disc is present in a disc sensing portion is shown in FIG. 4.

A supporting shaft 24 that is perpendicular to a face of the disc 12 loaded in the disc loading position Dp is provided upright to the base 16 on the inner side than the disc loading position Dp in the disc inserting direction. A base end 25a of a swinging lever 25 is supported turnably by the supporting shaft 24, and a top end 25b of the swinging lever 25 can be swung in arrow C, D directions in FIG. 3. A disc arriving switch 26 from which a contact 26a is projected is secured to an upper surface of the top end 25b of the swinging lever 25.

A sensing lever 27 is arranged on an upper surface of the swinging lever 25 to overlap each other, and a base end 27a of the sensing lever 27 is supported turnably by the supporting shaft 24. A top end 27b of the sensing lever 27 can be swung in the arrow C, D directions in FIG. 3. That is, the swinging lever 25 and the sensing lever 27 are supported coaxially by the supporting shaft 24. Also, a contact portion 28 that contacts an outer periphery of the disc 12 is formed on the top end 27b of the sensing lever 27. Also, a pushing stepped portion 29 is formed on the rear portion of the sensing lever 27. When the sensing lever 27 is swung in the direction approaching the disc arriving switch 26, the pushing stepped portion 29 pushes the contact 26a to operate. In this case, it is preferable that the sensing lever 27 should be energized by an energizing unit (not shown) in the direction (arrow D direction in FIG. 3) along which its top end 27b projects into the inside of the disc loading position Dp.

The swinging lever 25 and the sensing lever 27 are swung by a lever driving system (not shown) in the arrow C, D directions in FIG. 3. The levers driven by the lever driving system do not contact the loaded disc 12 in an initial position shown in FIG. 3, and thus the loaded disc 12 can make ascending/descending operations. In this state, the sensing lever 27 and the disc arriving switch 26 do not contact mutually. That is, the output signal of the disc arriving switch 26 goes to Hi (OFF).

Also, as shown in FIG. 4, in the disc searching operation, the swinging lever 25 and the sensing lever 27 are turned by the lever driving system (not shown) in the arrow D direction in FIG. 4. At that time, the sensing lever 27 and the disc arriving switch 26 do not come into contact with each other when the disc 12 is not present in the disc loading position Dp. That is, a relative position of the sensing lever 27 and the disc arriving switch 26 coincides with an initial position, and the output signal of the disc arriving switch 26 still remains at Hi (OFF).

In contrast, in the disc searching operation, the swinging lever 25 and the sensing lever 27 are turned by the lever driving system (not shown) in the arrow D direction in FIG. 3. At that time, the contact portion 28 of the sensing lever 27 comes into contact with the disc 12 when the disc 12 is present in the disc loading position Dp. Thus, a relative position of the sensing lever 27 and the swinging lever 25 is changed, then the contact 26a is pushed/operated by the pushing stepped portion 29 of the sensing lever 27, and then the output signal of the disc arriving switch 26 goes to Lo (ON). According to these operations, a sensing of the disc 12 can be implemented.

Now, in the disc inserting operation, when it is sensed by the disc arriving switch 26 that the disc 12 being carried arrives at the neighborhood of the disc loading position Dp, an operation control is applied such that the sensing lever 27 and the swinging lever 25 are retracted from the disc loading position Dp. More particularly, the disc arriving switch 26 is pushed/operated by the sensing lever 27 that is swung when the top end contacts the outer periphery of the disc 12, then the lever driving system is driven in response to this operation signal, and then the swinging lever 25 is swung to retreat from the disc loading position Dp. As a result, the disc being carried is loaded at a low speed while contacting the sensing lever 27 being retreated and thus a reduction in a hitting sound can be attained.

Also, in the optical disc device 10, in the disc ejecting operation, an operation control to rotate the roller member 14 is carried out when it is sensed that the disc arriving switch 26 comes into touch with the disc 12 that is being loaded.

In addition, the optical disc device 10 is equipped with a disc IN switch, a pushing-out completion switch, an origin switch, and a lever driving system (all not shown). The disc IN switch senses that the disc 12 has been inserted into the main body 13 through the disc slot 11. The pushing-out completion switch is a switch provided to sense states of the swinging lever 25 and the sensing lever 27, and senses pushing-out completion positions of the swinging lever 25 and the sensing lever 27. That is, the pushing-out completion switch can sense a disc insertion waiting state or a disc eject completion state. The origin switch is a switch provided to sense states of the swinging lever 25 and the sensing lever 27, and senses retreat completion positions (origin positions) of the swinging lever 25 and the sensing lever 27. Accordingly, the origin switch can sense a disc loading completion state or a disc eject start state. The lever driving system can move the swinging lever 25 and the sensing lever 27 to project into the disc loading position Dp and retreat from this position, as described above.

In addition, the optical disc device 10 is equipped with a spindle motor (not shown) for turning the disc 12, an optical pickup (not shown) for recording/reproducing the information of the disc 12, and a traverse motor (not shown) for driving the optical pickup in the inner peripheral and outer peripheral direction of the disc 12.

Next, an operation of the optical disc device 10 having such a configuration will be explained hereunder.

Figure 5:
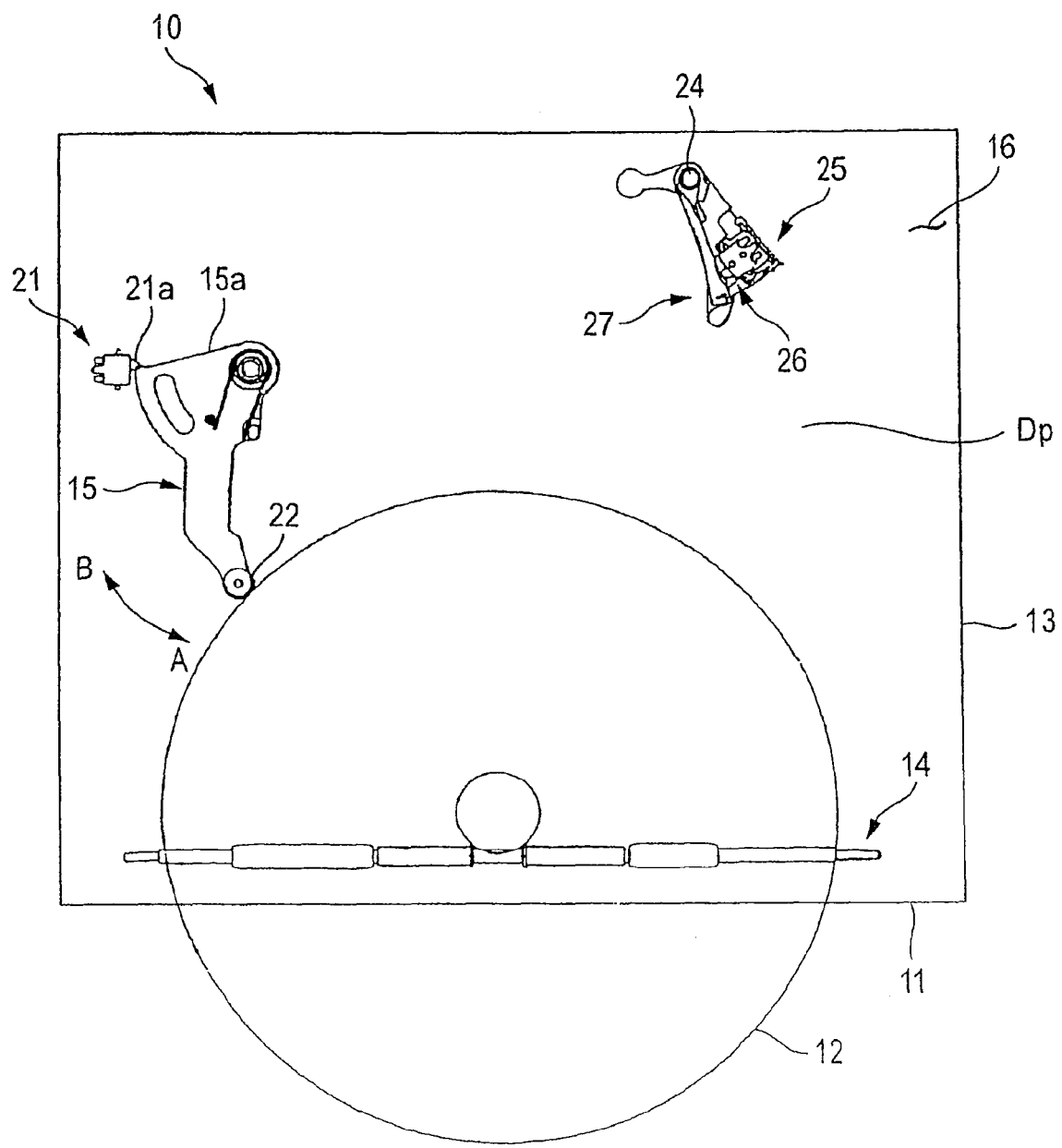
[FIG. 5] A plan view of an optical disc device main body showing a state that the inserted disc is sensed by a loading completing switch, in the optical disc device according to the embodiment of the present invention.
Figure 6:
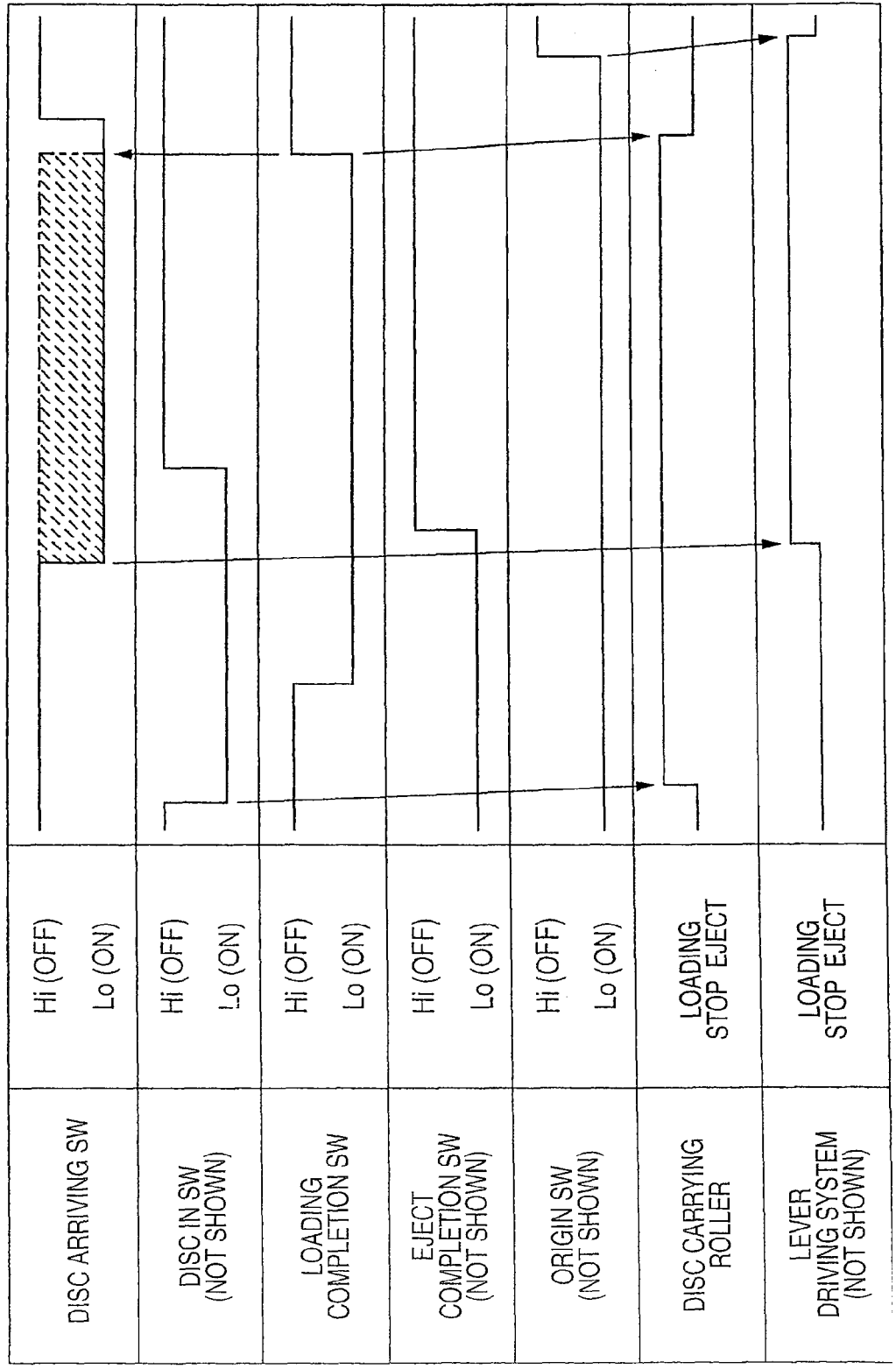
[FIG. 6] A timing chart of a disc loading operation of the optical disc device according to the embodiment of the present invention.

A plan view of the optical disc device main body showing a state that the inserted disc is sensed by the loading completing switch is shown in FIG. 5. A timing chart of the disc loading operation in the optical disc device is shown in FIG. 6. In the present embodiment, the disc device reproduces or records the information by inserting/ejecting a 12-cm disc, but can handle a 8-cm disc. When the disc device reproduces or records the information of the 8-cm disc, the adaptor for holding the 8-cm disc in its center portion is utilized. The adaptor that is holding the 8-cm disc can be handled similarly to the 12-cm disc 12, and its explanation will be omitted herein.

(1) Loading Operation of the Disc 12

When the disc 12 is inserted into the optical disc device 10 through the disc slot 11 of the main body 13 by a user, the output signal of the disc IN switch is switched from Hi (OFF) to Lo (ON), as shown in FIG. 6, and thus the disc IN switch senses that the disc 12 has been inserted into the drive. Accordingly, the optical disc device 10 starts an operation of the power source and starts a rotation of the roller member 14, i.e., the loading of the disc.

As shown in FIG. 5, when an auto-loading of the disc 12 is continued and the disc 12 goes further forward, the push-on lever 15 is turned by the disc 12 in the arrow B direction, and then the contact 21a is pushed by the base end 15a. Thus, the output signal of the loading completion switch 21 goes to Lo (ON).

Figure 7:
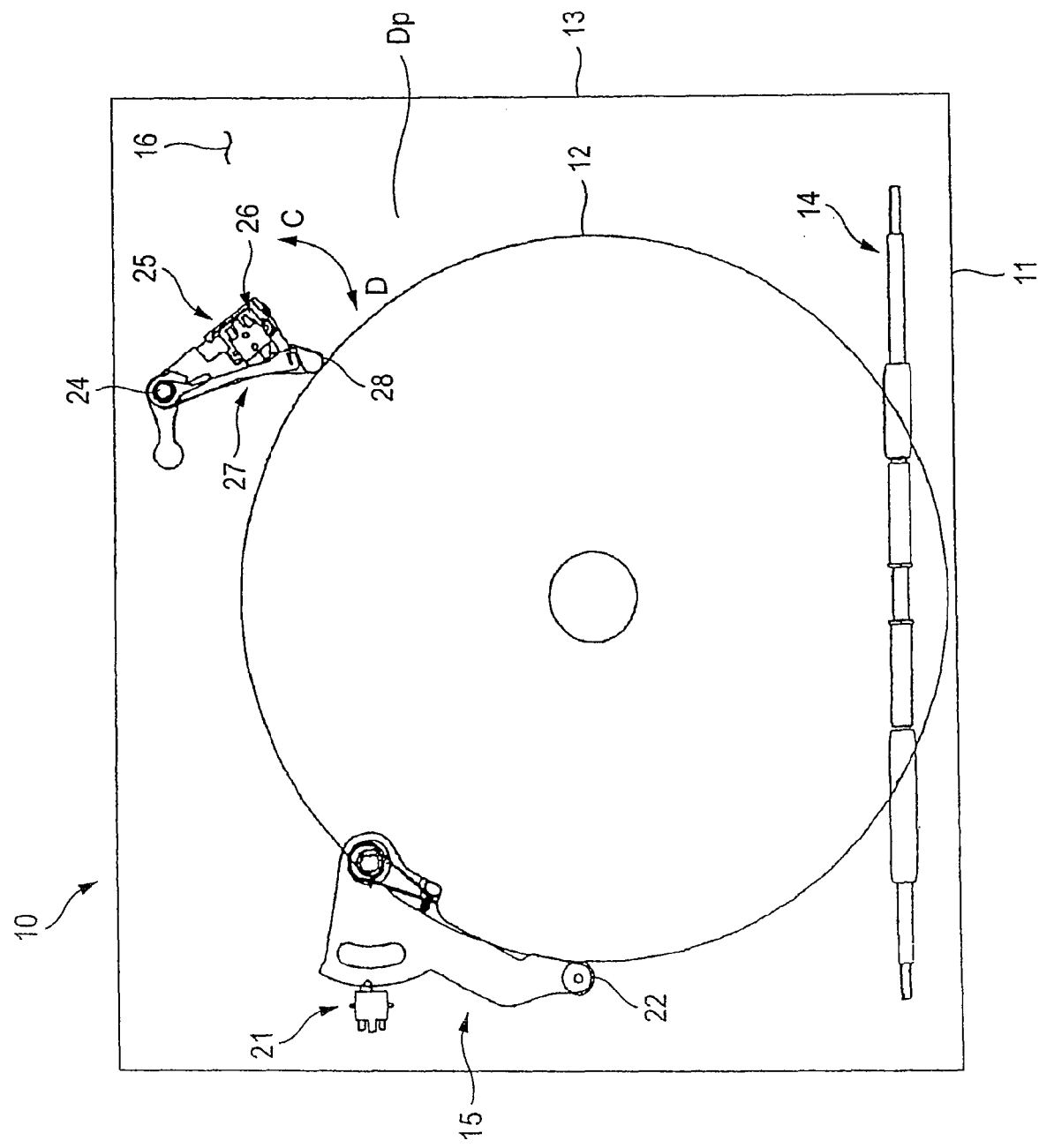
[FIG. 7] A plan view of an optical disc device main body showing a state that a retreat of the swinging lever and the sensing lever is started when the disc is sensed by a disc arriving switch, in the optical disc device according to the embodiment of the present invention.

A plan view of the optical disc device main body showing a state that a retreat of the swinging lever and the sensing lever is started when the disc is sensed by the disc arriving switch is shown in FIG. 7. A plan view of the optical disc device main body showing a state that the retreat of the swinging lever and the sensing lever is completed when the loading of the disc is completed is shown in FIG. 8.

As shown in FIG. 6, the swinging lever 25 and the sensing lever 27 are projected into the disc loading position Dp. This projection arrangement is provided by the lever driving system. Then, when the disc 12 is carried further in the loading direction, the outer periphery of the disc 12 contacts the contact portion 28 of the sensing lever 27 being protruded/arranged in the disc loading position Dp. As a result, a relative position between the sensing lever 27 and the swinging lever 25 is changed, and the contact 26a is pushed/operated by the pushing stepped portion 29 of the sensing lever 27. Thus, as shown in FIG. 6, the output signal of the disc arriving switch 26 goes to Lo (ON). Namely the disc 12 is sensed by the disc arriving switch 26.

When the sensing signal of the disc 12 is input from the disc arriving switch 26, the optical disc device 10 drives the lever driving system. The lever driving system turns the swinging lever 25 and the sensing lever 27 in the loading direction (the arrow C direction in FIG. 7), and drives/starts the swinging lever 25 and the sensing lever 27 to a retreat position. At this time, a driving speed of the lever driving system is controlled slightly slower than a carrying speed of the roller member 14. Accordingly, the disc 12 is loaded while being received by the sensing lever 27 because the outer periphery of the disc comes into touch with the sensing lever 27. At this time, the disc 12 is loaded in a state that the disc contacts three members of the roller member 14, the push-on lever 15, and the sensing lever 27.

Figure 8:
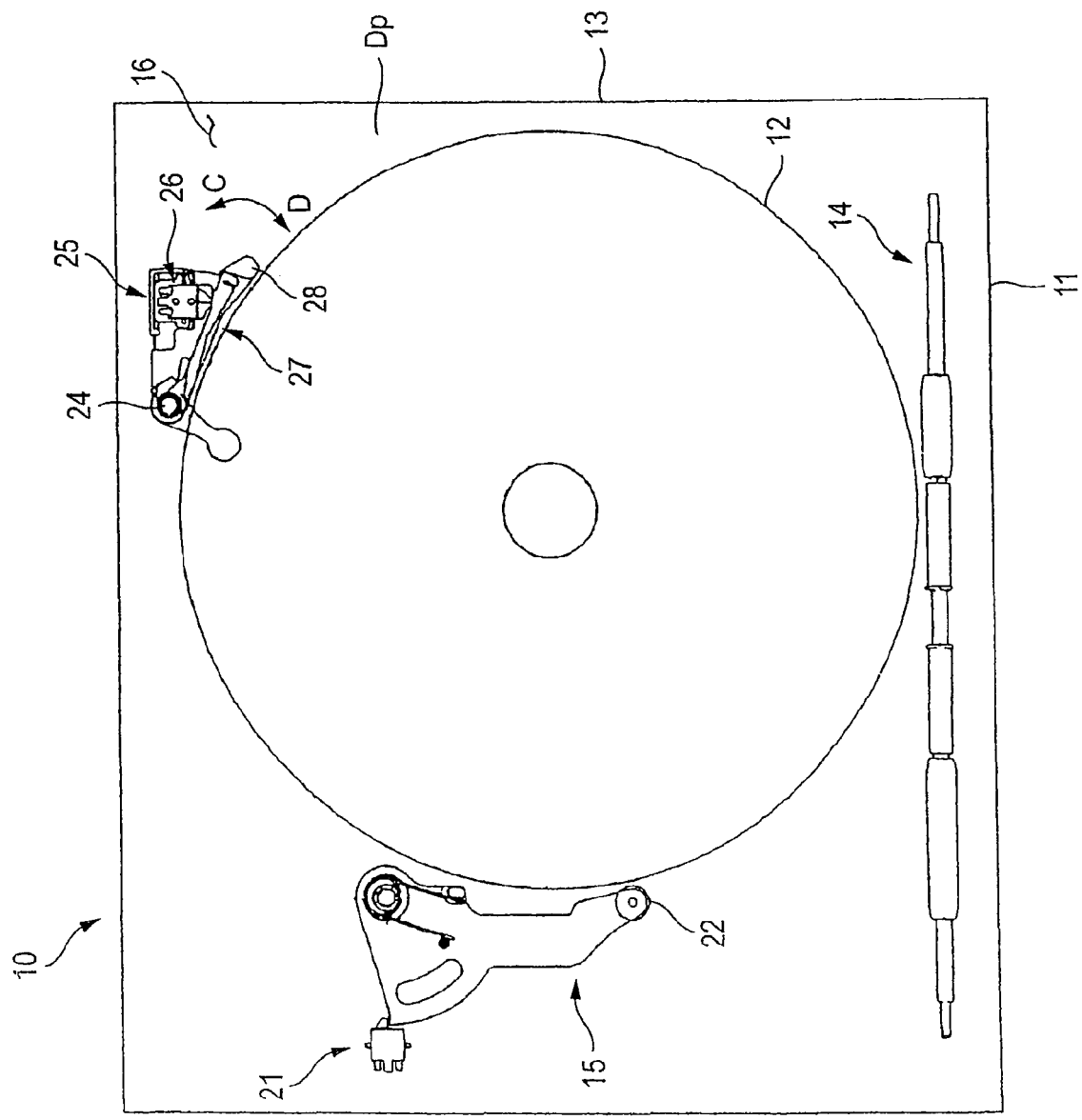
[FIG. 8] A plan view of an optical disc device main body showing a state that the retreat of the swinging lever and the sensing lever is completed when a loading of the disc is completed, in the optical disc device according to the embodiment of the present invention.

As shown in FIG. 8, when the disc 12 is loaded further in the loading direction, the output of the loading completion switch 21 changes to Hi (OFF) (see FIG. 6). In this condition, the roller member 14 continues to rotates in the loading direction. When the retreating operations of the swinging lever 25 and the sensing lever 27 is maintained by the lever driving system, the push-on lever 15 pushes on the disc 12 into the disc loading position Dp. Accordingly, the push-on lever 15 contacts a stopper (not shown), and thus a pushing of the disc 12 by the push-on lever 15 is released and then the push-on lever 15 is restored to an initial position. As a result, the loading of the disc 12 is completed.

Further, when the lever driving system still continues the retreating operations of the swinging lever 25 and the sensing lever 27, the sensing lever 27 detaches itself from the outer periphery of the disc 12, as shown in FIG. 8. Thus, the output of the disc arriving switch 26 changes to Hi (OFF).

Then, when the lever driving system is turned in the loading direction, the output of the origin switch changes to Hi (OFF). Accordingly, the optical disc device 10 stops the lever driving system and terminates the loading and the retreat of the swinging lever 25 and the sensing lever 27.

(2) Monitoring of the Contact Between the Swinging Lever 25/the Sensing Lever 27 and the Disc 12

In the timing chart shown in FIG. 6, the optical disc device 10 monitors that the output of the disc arriving switch 26 is still kept in Lo (ON) while the loading completion switch 21 is in Lo (ON) (in a shaded portion in the timing chart) after the disc arriving switch 26 goes to Lo (ON). The optical disc device 10 stops once the operation of the lever driving system when the output of the disc arriving switch 26 goes to Hi (OFF), and starts the operation of the lever driving system when the output of the disc arriving switch 26 goes again to Lo (ON).

Then, the disc 12 is carried to a recording/playing position by a not-shown mechanism, and is held on the spindle motor. The loading operation of the disc 12 is completed y this operation, and the optical disc device 10 is brought into its recording/playing condition.

(3) Ejecting Operation of the Disc 12

Figure 9:
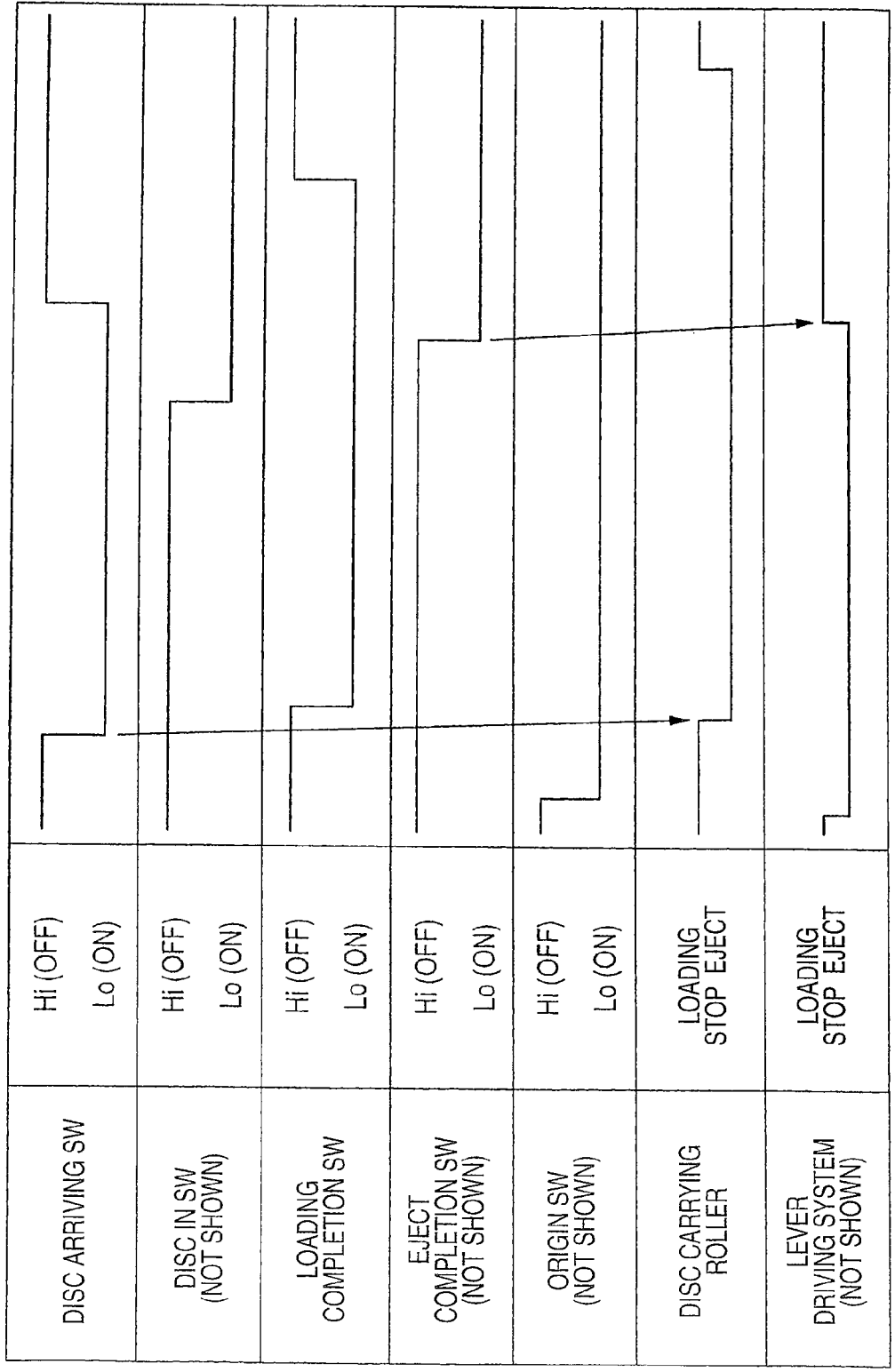
[FIG. 9] A timing chart in a disc ejecting operation in the optical disc device according to the embodiment of the present invention.
Figure 10:
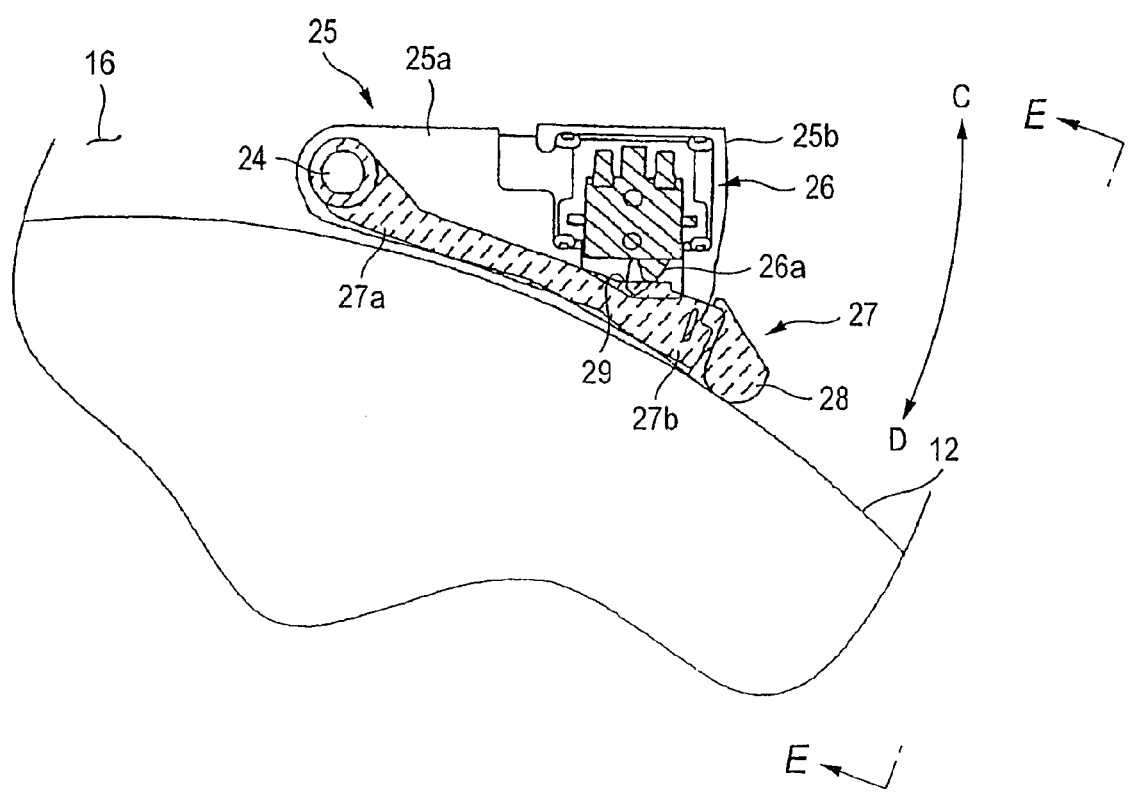
[FIG. 10] A plan view of an optical disc device main body showing a state that the disc is present in the disc sensing portion, in the optical disc device according to the embodiment of the present invention.

A timing chart in the disc ejecting operation in the optical disc device is shown in FIG. 9. A plan view of the optical disc device main body showing a state that the disc is present in the disc sensing portion is shown in FIG. 10. A view of the optical disc device when viewed along an E-E arrow line in FIG. 10 is shown in FIG. 11.

First, the holding of the disc 12 on the spindle motor is released by a not-shown mechanism, and the ejecting operation of the disc 12 is started. The disc 12 is carried by the not-shown mechanism in the ejecting direction.

Figure 11:
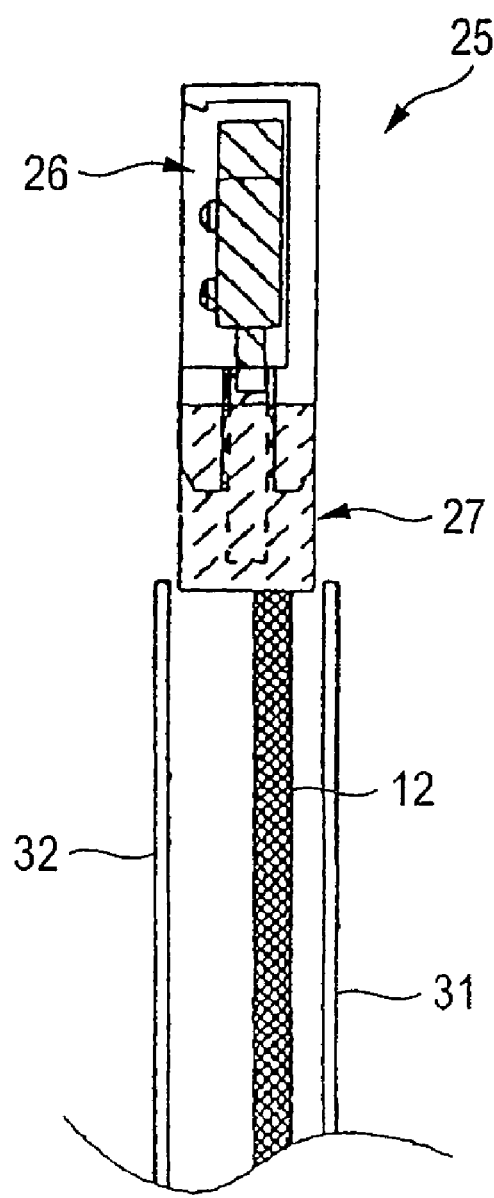
[FIG. 11] A view of the optical disc device according to the embodiment of the present invention when viewed along an E-E arrow line in FIG. 10.
Figure 12:
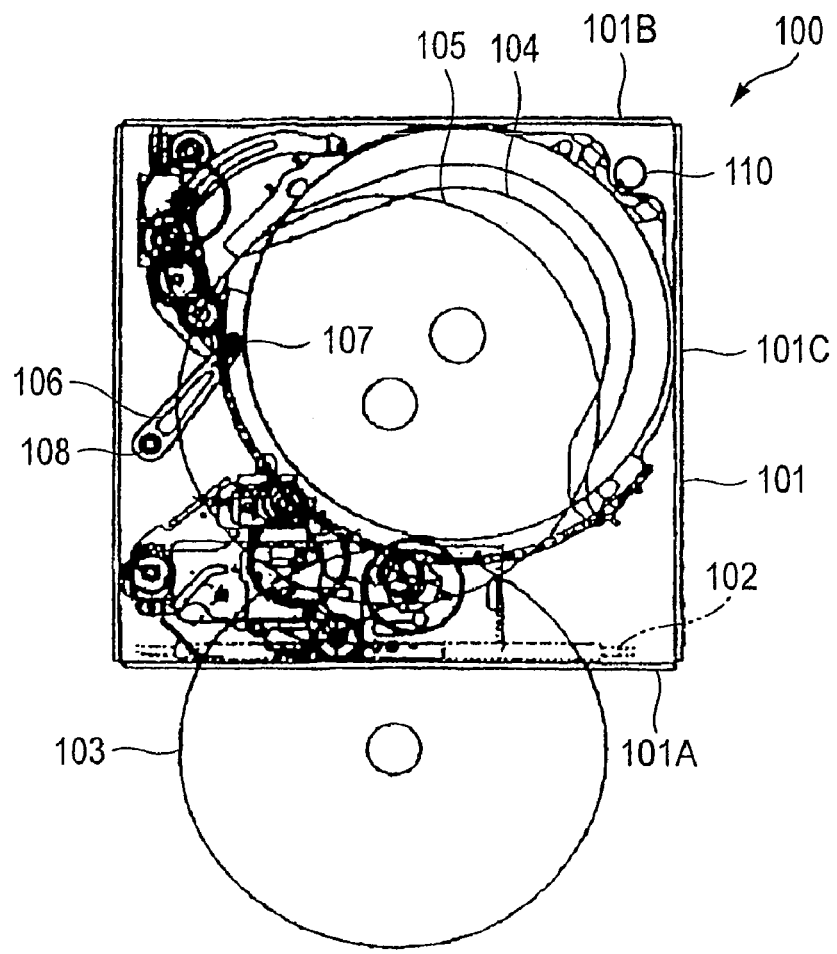
[FIG. 12] A plan view of the optical disc device in the prior art.
Figure 13:
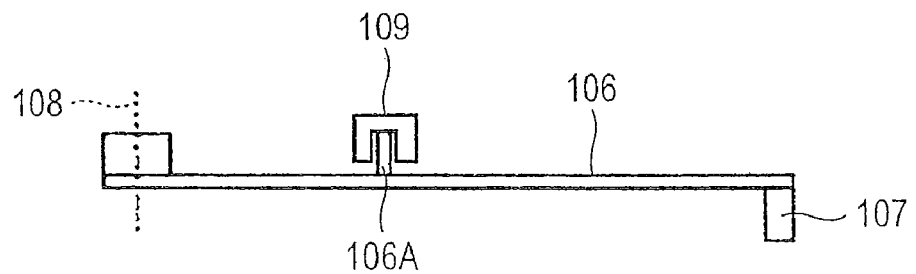
[FIG. 13] A side view of a lever of the optical disc device in the prior art.
Figure 14:
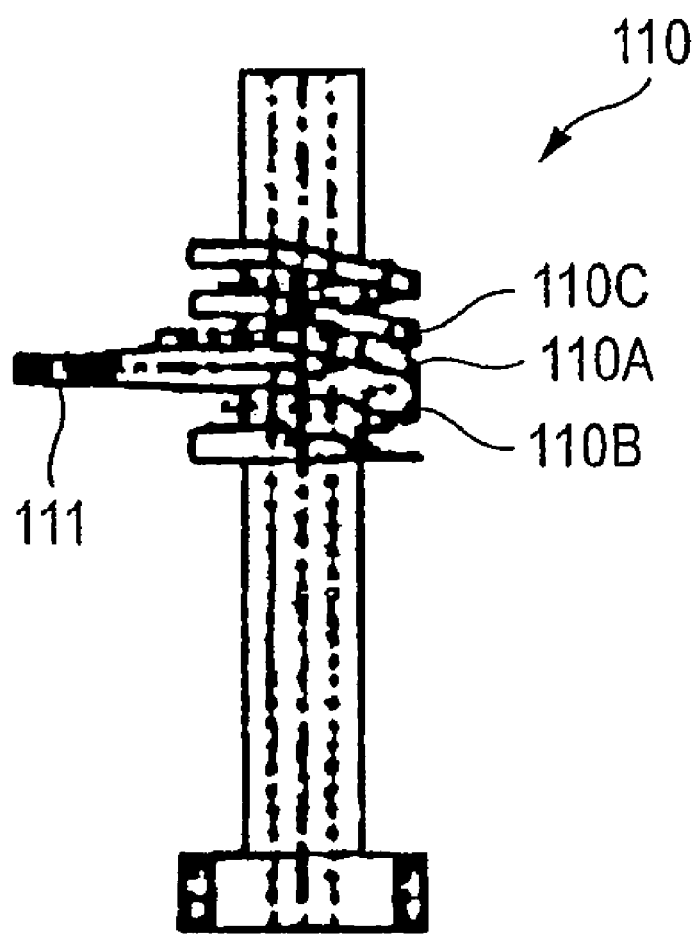
[FIG. 14] A side view of a cam gear of the optical disc device in the prior art.

As shown in FIG. 10 and FIG. 11, when the lever driving system is turned in the ejecting direction (the arrow D direction in FIG. 10), the disc 12 contacts the push-on lever 15 because the lever driving system contacts the sensing lever 27. Thus, the output of the disc arriving switch 26 changes to Lo (ON) (see FIG. 9). The optical disc device rotates the roller member 14 in the ejecting direction (see FIG. 9).

The roller member 14 and the upper roller member hold the disc 12 between them and carry it in the ejecting direction. Then, when the optical disc device rotates further the lever driving system in the ejecting direction, the output of the pushing-out completion switch (not shown) changes to stop the lever driving system. The roller member 14 and the upper roller member further carry the disc in the ejecting direction. At this time, the ejecting completion switch (not shown) senses that the disc 12 has been carried up to the eject position. The optical disc device 10 stops the roller member 14 in response to this signal and terminates the ejection. In this manner, in the ejecting operation, since a start of rotation of the roller member 14 can be controlled based on the output of the disc arriving switch 26, a running time of the motor can be shortened in the no-load state and also a noise of the motor can be reduced.

According to the optical disc device 10 of the embodiment of the present invention, the swinging lever 25 to which the disc arriving switch 26 is fixed and whose base end is supported turnably by the supporting shaft 24 in the main body and the sensing lever 27 whose base end is supported turnably by the supporting shaft 24 and whose top end contacts the outer periphery of the disc, which is loaded in the disc loading position, to operate the disc arriving switch 26 are provided, then the swinging lever 25 and the sensing lever 27 are supported turnably on the same supporting shaft 24 as a fulcrum, and then the disc arriving switch 26 is operated according to a relative positional change of the swinging lever 25 and the sensing lever 27. Therefore, unlike the configuration in the prior art, there is no need to provide the pushing-out lever and the sensing lever and drive/control the pushing-out lever at a timing that is given by the sensor and changed during carrying the disc. As a result, an error due to a delay of the sensing operation, etc. is not caused, and thus it is sensed exactly whether or not the disc 12 is present.

According to the optical disc device 10 of the embodiment of the present invention, the swinging lever 25 to which the disc arriving switch 26 is fixed and the sensing lever 27 whose top end contacts the outer periphery of the disc 12 to operate the disc arriving switch 26 are provided, and then the sensing lever 27 is projected into the disc loading position Dp in inserting the disc into the disc loading position Dp. Therefore, the disc 12 that is free from restraint of the roller member 14 moves to the disc loading position Dp while pushing the sensing lever 27 and thus a hard hitting sound can be eliminated. As a result, a hitting sound generated in loading the disc can be reduced by a simple configuration the number of articles of which is small. Also, in the ejecting operation, since a start of rotation of the roller member 14 can be controlled based on the output of the disc arriving switch 26, a running time of the motor can be shortened in the no-load state (the loading motor is not excessively rotated) and also a noise of the motor can be reduced.

This application is based upon Japanese Patent Application (Patent Application No. 2005-013147) filed on Jan. 20, 2005; the contents of which are incorporated herein by reference.

INDUSTRIAL APPLICABILITY

As described above, the present invention has the swinging lever to which the disc arriving switch is fixed and whose base end is supported turnably by the supporting shaft in the main body and the sensing lever whose base end is supported turnably by the supporting shaft and whose top end contacts the outer periphery of the disc, which is loaded in the disc loading position, to operate the disc arriving switch are provided. Therefore, the present invention possesses such an advantage that an error due to a delay of the sensing operation generated by operating a plurality of members jointly, and the like is not caused, and is useful to an optical disc device, and the like.

The invention claimed is:

1. An optical disc device, comprising:
   a main body which has a disc slot;
   a carrying roller which carries a disc between the disc slot and a disc loading position of the main body at a predetermined speed;
   a swinging lever whose base end is turnably supported in an inside of the main body by a supporting shaft and to which a disc arriving switch is fixed;
   a sensing lever whose base end is supported turnably to the supporting shaft so that a relative position of the sensing lever and the swinging lever is changeable; and
   a lever driving system which drives the swinging lever and the sensing lever,
   wherein the swinging lever and the sensing lever are simultaneously swung around the support shaft by the lever driving system,
   wherein a top end of the sensing lever contacts an outer periphery of the disc, which is loaded in a disc loading position, to operate the disc arriving switch during a swinging operation of the swinging lever and the sensing lever,
   wherein the sensing lever pushes the disc arriving switch, and
   wherein the lever driving system drives the swinging and sensing levers to retreat them away from the disc according to the operation of the disc arriving switch by the sensing lever.

2. The optical disc device according to claim 1, wherein the disc arriving switch is pushed and operated by the sensing lever which is swung when the sensing lever contacts the outer periphery of the disc, so that it is sensed whether or not the disc is present.

* * * * *